US008671454B2

(12) United States Patent
Ezell et al.

(10) Patent No.: US 8,671,454 B2
(45) Date of Patent: Mar. 11, 2014

(54) SYSTEM FOR SECURE WEB-PROMPT PROCESSING ON POINT OF SALE DEVICES

(75) Inventors: David Bruce Ezell, Tampa, FL (US); Chris Anthony Madden, Dublin (IE); Aidan Totterdell, Wicklow (IE)

(73) Assignee: Verifone, Inc., San Jose, CA (US)

( * ) Notice: Subject to any disclaimer, the term of this patent is extended or adjusted under 35 U.S.C. 154(b) by 328 days.

(21) Appl. No.: 12/939,719

(22) Filed: Nov. 4, 2010

(65) Prior Publication Data

US 2012/0117664 A1    May 10, 2012

(51) Int. Cl.
    *G06F 21/00*   (2013.01)
    *G06Q 20/00*   (2012.01)
    *G06F 21/60*   (2013.01)
    *G06F 11/30*   (2006.01)
    *G06Q 20/20*   (2012.01)

(52) U.S. Cl.
    CPC ............ *G06F 21/60* (2013.01); *G06F 11/3003* (2013.01); *G06Q 20/20* (2013.01)
    USPC .................... 726/26; 726/30; 705/16; 705/18

(58) Field of Classification Search
    None
    See application file for complete search history.

(56) References Cited

U.S. PATENT DOCUMENTS

| 4,180,856 A * | 12/1979 | Check et al. .................. 705/407 |
| 5,371,798 A | 12/1994 | McWhortor |
| 6,003,763 A | 12/1999 | Gallagher |
| 6,360,952 B1 | 3/2002 | Kimlinger |
| 7,958,555 B1 * | 6/2011 | Chen et al. ...................... 726/22 |
| 8,220,047 B1 * | 7/2012 | Soghoian et al. ............... 726/22 |
| 2002/0063152 A1 | 5/2002 | Goodwin, III |
| 2002/0180584 A1 | 12/2002 | McGregor |
| 2002/0194081 A1 * | 12/2002 | Perkowski ...................... 705/26 |
| 2003/0037236 A1 * | 2/2003 | Simon et al. .................... 713/161 |
| 2005/0038787 A1 * | 2/2005 | Cheung et al. ..................... 707/9 |
| 2005/0210173 A1 | 9/2005 | Kehoe |
| 2008/0235103 A1 * | 9/2008 | Baccas et al. ................... 705/26 |
| 2008/0270514 A1 | 10/2008 | Soares Pi Farias |
| 2009/0158145 A1 * | 6/2009 | Schering ...................... 715/275 |
| 2009/0276358 A1 | 11/2009 | Dutta |

FOREIGN PATENT DOCUMENTS

WO    03/065178 A2    8/2003

OTHER PUBLICATIONS

An Office Action dated May 30, 2012, which issued during the prosecution of European Patent Application No. 06848662.0.
Hypercom Corporation: "ePic: Internet-Enable POS", 2000, pp. 1-13, XP002626585.
Office Action dated Jul. 12, 2012 which issued during the prosecution of U.S. Appl. No. 11/465,479.

* cited by examiner

*Primary Examiner* — Matthew Henning
(74) *Attorney, Agent, or Firm* — Sughrue Mion, PLLC

(57) ABSTRACT

A point of sale system including at least one proxy server having an internet connection, a web browser operative to download web pages from the internet via the proxy server, and a real time user input limiting trusted computing base module communicating with the web browser and being operative to limit user input to the web pages in real time.

13 Claims, 4 Drawing Sheets

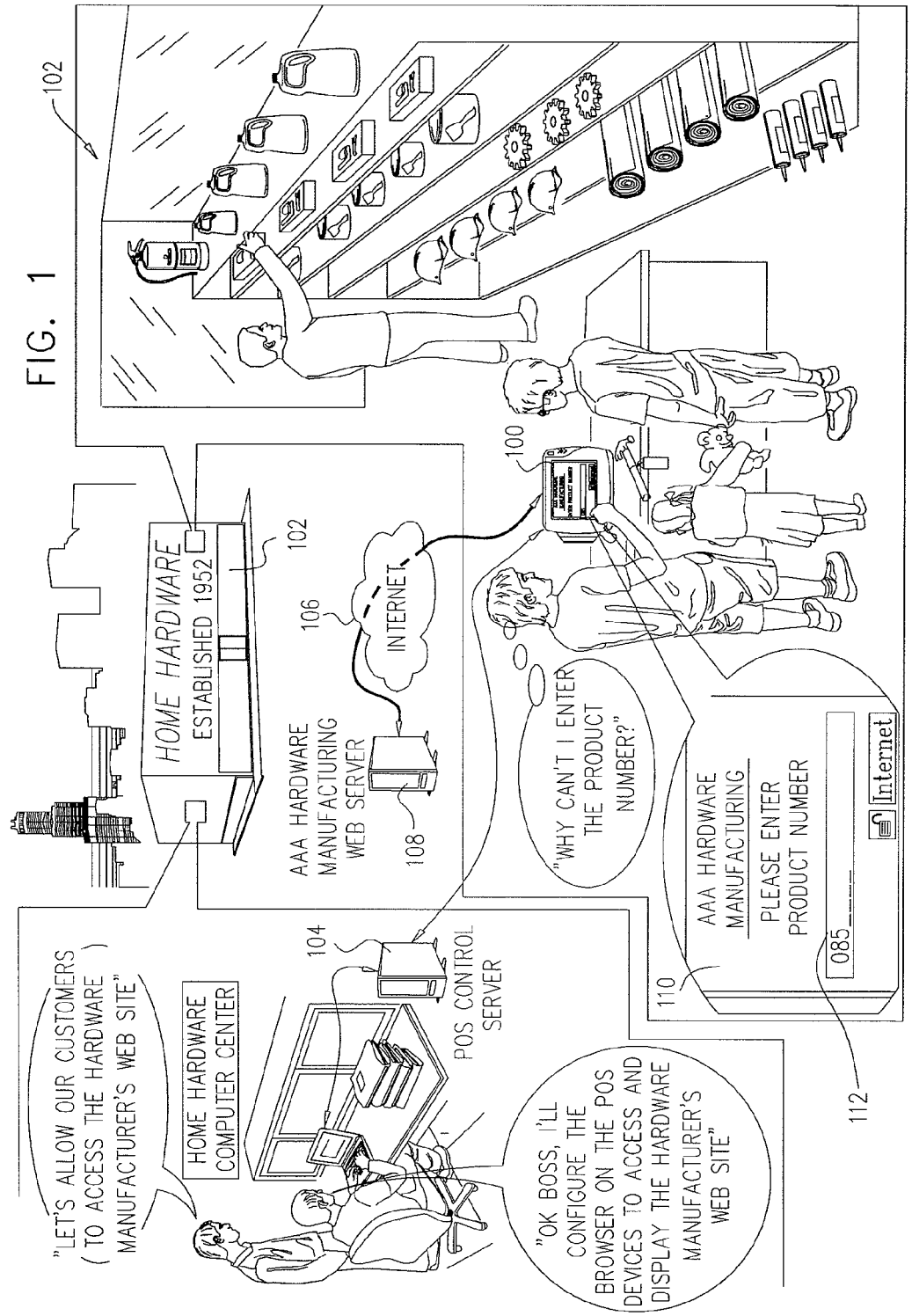

SYSTEM FOR SECURE WEB-PROMPT PROCESSING ON POINT OF SALE DEVICES

FIELD OF THE INVENTION

The present invention relates to systems for secure web-prompt processing on point of sale devices.

BACKGROUND OF THE INVENTION

The following publication is believed to represent the current state of the art:

U.S. Published Patent Application No.: 2008/0270514.

SUMMARY OF THE INVENTION

The present invention seeks to provide systems for secure web-prompt processing on point of sale devices.

There is thus provided in accordance with a preferred embodiment of the present invention a point of sale system including at least one proxy server having an internet connection, a web browser operative to download web pages from the internet via the proxy server, and a real time user input limiting trusted computing base module communicating with the web browser and being operative to limit user input to the web pages in real time.

In accordance with a preferred embodiment of the present invention, the trusted computing base module is operative to identify trusted internet pages, which originate from a trusted source or are signed by a trusted authority, and non-trusted internet pages which do not originate from a trusted source or are not signed by a trusted authority. Preferably, the web pages are non-trusted internet pages.

Additionally, the trusted computing base module includes web page parsing functionality. Preferably, the web page parsing functionality is operative to analyze the Document Object Model of a web page and to identify secure web page elements.

In accordance with a preferred embodiment of the present invention, the trusted computing base module includes web page element input limiting functionality which is operative to limit user input to web page elements which are not secure web page elements, in real time. Preferably, the web page element input limiting functionality includes alpha-numeric string entry limiting functionality. Preferably, the alpha-numeric string entry limiting functionality is operative to enforce the "three hot-zone" rule. Preferably, the web page element input limiting functionality is operative to limit input received from one of a keypad, a touchscreen and a smartcard reader.

There is also provided in accordance with another preferred embodiment of the present invention a point of sale system including at least one proxy server having an internet connection, and a plurality of POS devices communicating with the at least one proxy server, at least some of which provide limited internet access via the at least one proxy server. Preferably, the system also includes a POS control server which controls the plurality of POS devices.

In accordance with a preferred embodiment of the present invention, each of the plurality of POS devices includes a web browser operative to download web pages from the internet via the proxy server, and a real time user input limiting trusted computing base module communicating with the web browser and being operative to limit user input to the web pages in real time.

Preferably, the trusted computing base module is operative to identify trusted internet pages, which originate from a trusted source or are signed by a trusted authority, and non-trusted internet pages which do not originate from a trusted source or are not signed by a trusted authority. Preferably, the web pages are non-trusted internet pages.

Additionally, the trusted computing base module includes web page parsing functionality. Preferably, the web page parsing functionality is operative to analyze the Document Object Model of a web page and to identify secure web page elements.

In accordance with a preferred embodiment of the present invention, the trusted computing base module includes web page element input limiting functionality which is operative to limit user input to web page elements which are not secure web page elements, in real time. Preferably, the web page element input limiting functionality includes alpha-numeric string entry limiting functionality. Preferably, the alpha-numeric string entry limiting functionality is operative to enforce the "three hot-zone" rule. Additionally, the web page element input limiting functionality is operative to limit input received from one of a keypad, a touchscreen and a smartcard reader.

BRIEF DESCRIPTION OF THE DRAWINGS

The present invention will be understood and appreciated more fully from the following detailed description, taken in conjunction with the drawings in which:

FIG. 1 is a simplified pictorial illustration of the operation of a system, constructed and operative in accordance with a preferred embodiment of the present invention, for secure web-prompt processing on POS devices;

DETAILED DESCRIPTION OF PREFERRED EMBODIMENTS

Figure 2A:
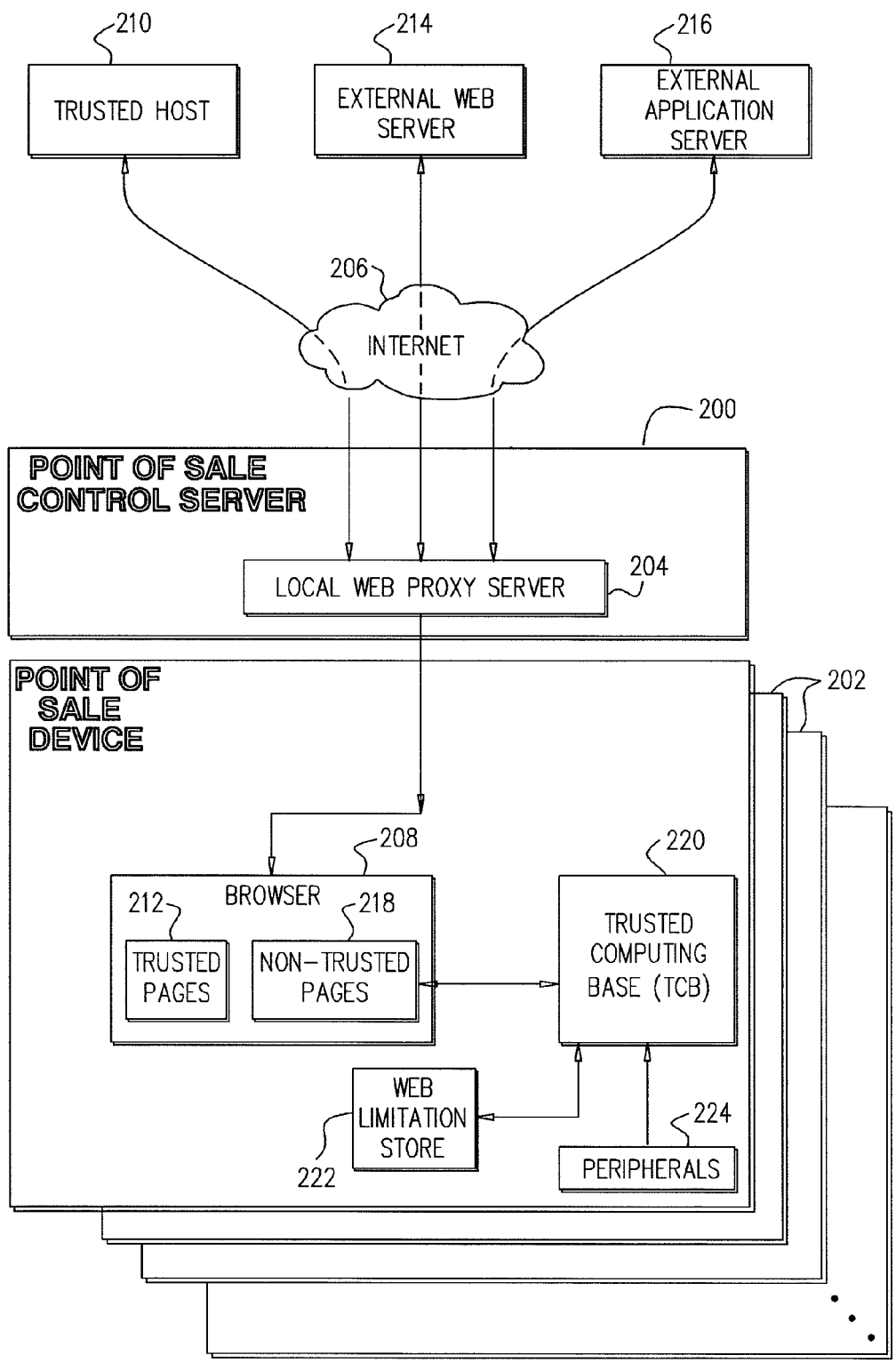
FIGS. 2A and 2B are simplified block diagram illustrations of preferred embodiments of the system of FIG. 1.

Today's point of sale payment devices are designed to be extremely secure, in order to prevent malicious access to confidential and\or restricted and\or private financial information of those using the devices for executing legitimate business transactions. Therefore, content allowed to be loaded onto the devices is typically restricted to pages or prompts that are static and that are either signed or verified against a signed table of authorized prompts provided by the vendor of the device, thereby preventing disclosure of PIN codes and other transaction data to unauthorized parties.

The aforementioned restrictions prevent merchants from updating and deploying payment device prompts for purposes such as promoting, branding and advertising their business without compromising device security. Maintaining secure prompts is costly in terms of time and logistical effort, and requires expertise and security infrastructure often not available to an individual merchant. The present invention seeks to provide systems and methods for secure web-prompt processing on PIN entry devices such as point of sale (POS) payment devices.

Reference is now made to FIG. 1, which is a simplified pictorial illustration of the operation of a system, constructed and operative in accordance with a preferred embodiment of the present invention, for secure web-prompt processing on POS devices. The system of FIG. 1 is a point of sale system comprising at least one proxy server having an internet connection, a web browser operative to download web pages from the internet via said proxy server and a real time user input limiting trusted computing base module communicating with said web browser and being operative to limit user input to said web pages in real time.

The term "proxy server" for the purposes of this application is defined to be any software based mechanism that provides access to remote content which is accessed by using a URL.

As shown in FIG. 1, a POS device 100 serving a hardware store 102 is connected to a POS control server 104. POS control server 104 may control one or more POS devices which are in use by hardware store 102.

As seen in FIG. 1, the manager of hardware store 102 decides to allow customers visiting store 102 to use the POS device 100 to access the internet 106 and to interact with a hardware manufacturer's web server 108. The manager therefore instructs the manager of the hardware store computer center to configure the POS device 100 in use by hardware store 102 to access the hardware manufacturer's web server 108 through the internet 106, and to download and display web pages from the hardware manufacturer's web server 108 on POS device 100. Thereafter, as seen in FIG. 1, a web page 110 is downloaded from the hardware manufacturer's web server 108 via the internet 106 and is displayed on POS device 100.

As further shown in FIG. 1, customers visiting hardware store 102 may view a non-trusted web page 110 on POS device 100. Web page 110 comprises a prompt 112 for user information, such as a product number. The POS device 100 analyzes web server 108 and web page 110, and ascertains that web page 110 is a non-trusted web page.

For the purposes of this application, web pages which originate from a trusted source or web pages which are signed by a trusted authority using a known certificate are considered to be trusted web pages. All other web pages are considered to be non-trusted. In the example of FIG. 1, web server 108 is not a trusted source and web page 110 is not signed by a trusted authority with a known certificate.

It is a particular feature of the present invention that POS device 100 analyzes all content prior to the display of the content on POS device 100, and prevents prompts which are part of non-trusted web pages from accepting user input which comprises between 4 and 12 consecutive digits. This limitation is effective in preventing entry of PIN codes, which are typically between 4 and 12 digits long. For the purposes of this application, the limitation which prevents accepting user input comprising more than 3 consecutive digits into a single prompt is referred to as the "three hot-zone" rule.

Returning now to FIG. 1, upon ascertaining that web page 110 is a non-trusted web page, POS device 100 prevents the customers from entering more than 3 digits into prompt 112 in accordance with the "three hot-zone" rule. It is appreciated that POS device 100 may employ and enforce any other rule which prevents a user from entering any particular combination of alpha-numeric characters.

It is a particular feature of the present invention that POS device 100 allows prompts which are part of trusted web pages to accept any user input sequence.

Figure 2B:
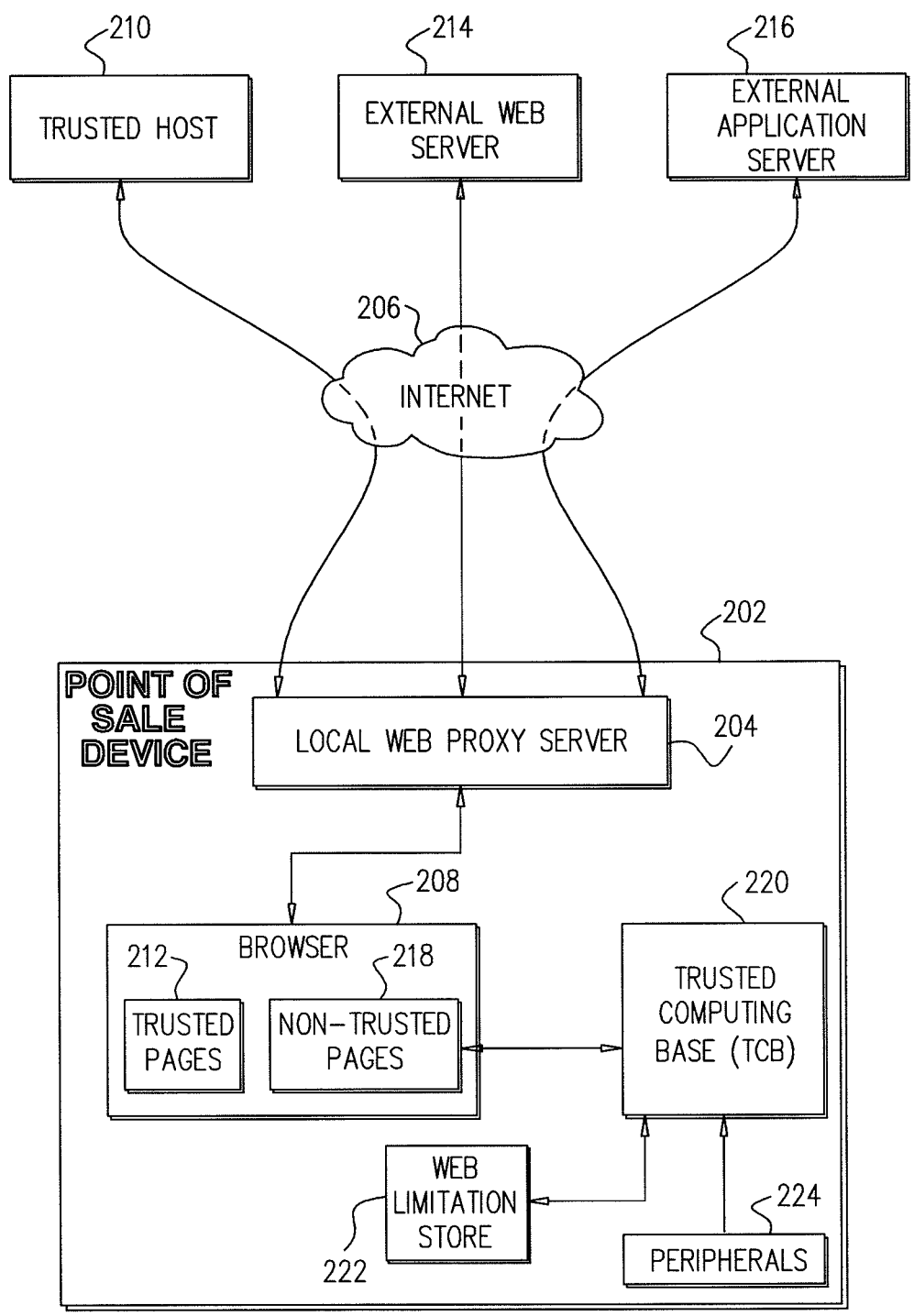

Reference is now made to FIGS. 2A and 2B, which are simplified block diagram illustrations of preferred embodiments of the system of FIG. 1. As seen in FIG. 2A, a point of sale control server 200, which controls a multiplicity of point of sale devices 202, comprises a local web proxy server 204 which is connected to the internet 206. Local web proxy server 204 also communicates with a multiplicity of web browsers 208 residing on corresponding multiplicity of point of sale devices 202.

Alternatively, as shown in FIG. 2B, a single point of sale device 202 is employed. In the embodiment of FIG. 2B, point of sale control server 200 is obviated, and proxy server 204 is included in point of sale device 202.

As shown in FIGS. 2A & 2B, proxy server 204 is operative to intercept download requests from browser 208 to download web pages from servers connected to the internet 206, to download the requested web pages and to analyze the trustworthiness of the downloaded web pages. Web pages which originate from a trusted source such as a trusted host 210 or web pages which are signed by a trusted authority are labeled as trusted web pages 212. All other web pages, such as pages which originate from a non-trusted source such as an external web server 214 or from an external application server 216, are labeled as non-trusted web pages 218.

A trusted computing base (TCB) module 220 communicates with web browser 208 and is operative to analyze non-trusted web pages 218 displayed by browser 208 for content that may compromise device security. The TCB module 220 analyzes non-trusted web pages, preferably by analyzing the Document Object Model (DOM) of a non-trusted web page, creates a limitation list of elements that are considered secure and therefore may process user input, and stores the limitation list in a web limitation store 222. For example, DOM elements that do not process numerical inputs are considered to be secure elements. DOM elements that might potentially process numerical inputs are considered to be potentially non-secure, and are not included in the limitation list.

TCB module 220 may also receive communications of user generated events from peripherals 224 which peripherals may include, inter alia, a keypad, a touchscreen and a smartcard reader. The user generated events may include, for example, keystrokes which enter user input in the form of alpha numeric characters, and swiping of a smart card. TCB module 220 analyzes user input originating in any one of peripherals 224 and, based on information stored in limitation store 222 and on characteristics of the user input, ascertains whether it is secure to pass the user input to its relevant DOM element without violating device security policies, such as the "three hot-zone" rule. User input found to be unsecure is thereby ignored and is not processed by the web page.

Figure 3:
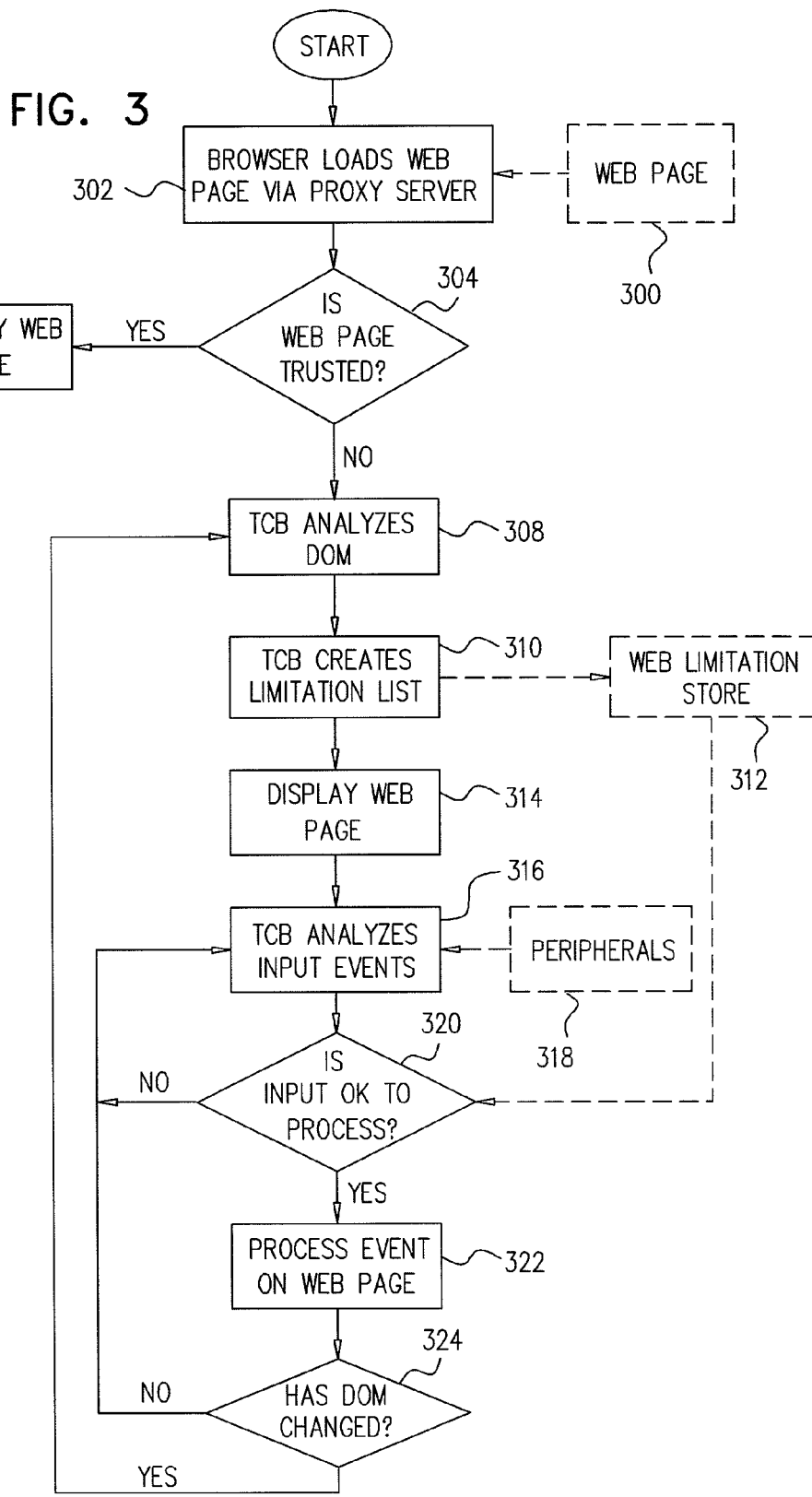
FIG. 3 is a simplified flow chart illustrating operation of the system of FIGS. 1-2B in accordance with a preferred embodiment of the present invention.

Reference is now made to FIG. 3, which is a simplified flow chart illustrating operation of the system of FIGS. 1-2B in accordance with a preferred embodiment of the present invention.

As shown in FIG. 3, a proxy server is operative to intercept download requests from a browser to download a web page 300 from the internet, and to download the requested web page (302). The proxy analyzes the trustworthiness of the downloaded web page (304) as described hereinabove with reference to FIGS. 2A & 2B, and allows for immediate display of a trusted web page (306) by the browser.

As also shown in FIG. 3, the TCB preferably analyzes non-trusted web pages by analyzing the Document Object Model (DOM) of a non-trusted web page (308), creates a limitation list of elements that are considered secure and therefore may process user input (310), and stores the limitation list in a web limitation store (312). Upon completion of the analysis, the browser displays the non-trusted web page (314).

While the non-trusted web page is displayed in the browser, the TCB module analyzes (316) user input originating in any one of the peripherals (318) and based on information stored in limitation store 312 and on characteristics of the user input ascertains whether it is secure to pass the user input to its relevant DOM element without violating device security policies, such as the "three hot-zone" rule (320), described hereinabove. User input found to be unsecure is thereby ignored and is not processed by the web page.

User input that is found to be secure is passed to its relevant DOM element on the web page and is processed (322). After the input is processed, the TCB module analyzes the DOM of the non-trusted web page to ascertain whether the DOM of the non-trusted web page has been modified as a result of the processing of the user input (324). If the DOM of the non-trusted web page has not been modified, the TCB module returns to receive and analyze (316) additional user input entered via peripherals 318. If the DOM of the non-trusted web page has been modified, the TCB module returns to analyze the modified DOM before receiving and analyzing any additional user input (308).

It will be appreciated by persons skilled in the art that the present invention is not limited by what has been particularly shown and described hereinabove. Rather the scope of the present invention includes both combinations and subcombinations of the various features described hereinabove as well as modifications thereof which would occur to persons skilled in the art upon reading the foregoing description and which are not in the prior art.

The invention claimed is:

1. A point of sale system comprising:
   at least one proxy server having an internet connection;
   a web browser operative to download web pages from the internet via said proxy server; and
   a real time user input limiting trusted computing base module communicating with said web browser and being operative to limit user input to said web pages in real time, said user input limiting trusted computing base module including web page element input limiting functionality which is operative, in real time, to limit user input to web page elements of said web pages which said web page elements are not secure web page elements, and which web page element input limiting functionality includes alpha-numeric string entry limiting functionality operative to prevent accepting all user inputs including more than three consecutive digits into a single prompt.

2. A point of sale system according to claim 1 and wherein said trusted computing base module is operative to identify trusted internet pages, which originate from a trusted source or are signed by a trusted authority, and non-trusted internet pages which do not originate from a trusted source or are not signed by a trusted authority.

3. A point of sale system according to claim 2 and wherein said web pages are non-trusted internet pages.

4. A point of sale system according to claim 1 and wherein said trusted computing base module includes web page parsing functionality.

5. A point of sale system according to claim 4 and wherein said web page parsing functionality is operative to analyze the Document Object Model of a web page and to identify secure web page elements.

6. A point of sale system according to claim 1 and wherein said web page element input limiting functionality is operative to limit input received from one of a keypad, a touchscreen and a smartcard reader.

7. A point of sale system comprising:
   at least one proxy server having an internet connection; and
   a plurality of POS devices communicating with said at least one proxy server, at least some of which provide limited internet access via said at least one proxy server, each of said plurality of POS devices comprising:
      a web browser operative to download web pages from the internet via said proxy server; and
      a real time user input limiting trusted computing base module communicating with said web browser and being operative to limit user input to said web pages in real time, said user input limiting trusted computing base module including web page element input limiting functionality which is operative, in real time, to limit user input to web page elements of said web pages which said web page elements are not secure web page elements, and which web page element input limiting functionality includes alpha-numeric string entry limiting functionality operative to prevent accepting all user inputs including more than three consecutive digits into a single prompt.

8. A point of sale system according to claim 7 and wherein said system also comprises a POS control server which controls said plurality of POS devices.

9. A point of sale system according to claim 7 and wherein said trusted computing base module is operative to identify trusted internet pages, which originate from a trusted source or are signed by a trusted authority, and non-trusted internet pages which do not originate from a trusted source or are not signed by a trusted authority.

10. A point of sale system according to claim 9 and wherein said web pages are non-trusted internet pages.

11. A point of sale system according to claim 7 and wherein said trusted computing base module includes web page parsing functionality.

12. A point of sale system according to claim 11 and wherein said web page parsing functionality is operative to analyze the Document Object Model of a web page and to identify secure web page elements.

13. A point of sale system according to claim 7 and wherein said web page element input limiting functionality is operative to limit input received from one of a keypad, a touchscreen and a smartcard reader.

* * * * *